Jan. 30, 1945.    G. ASSET ET AL    2,368,093
MEASURING APPARATUS
Filed Sept. 3, 1943    6 Sheets-Sheet 1
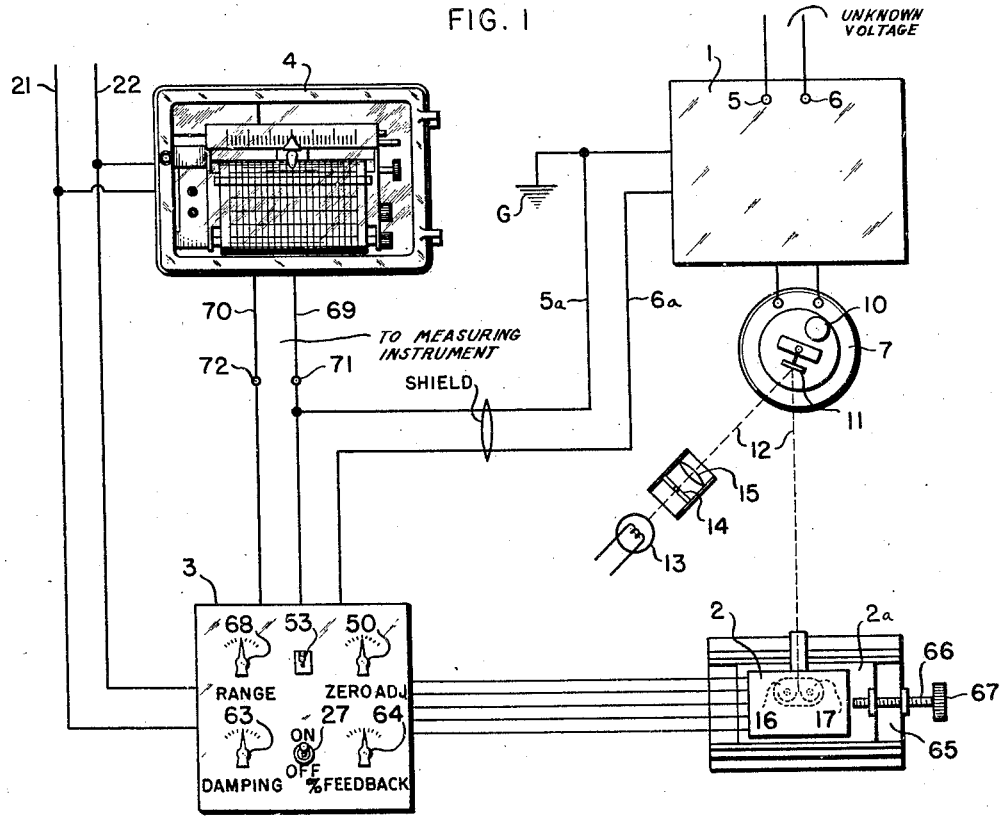
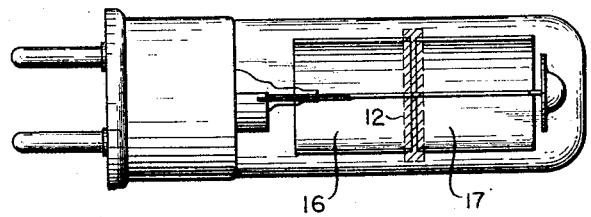
INVENTORS.
GABRIELLE ASSET
FRED J. CURRAN
WALTER P. WILLS
BY
CB Spangenberg
ATTORNEY Jan. 30, 1945.   G. ASSET ET AL   2,368,093
MEASURING APPARATUS
Filed Sept. 3, 1943   6 Sheets-Sheet 2

INVENTORS.
GABRIELLE ASSET
FRED J. CURRAN
WALTER P. WILLS
BY
CB Spangenburg
ATTORNEY.

INVENTORS.
GABRIELLE ASSET
FRED J. CURRAN
WALTER P. WILLS
BY
ATTORNEY

INVENTORS.
GABRIELLE ASSET
FRED J. CURRAN
WALTER P. WILLS
BY
ATTORNEY.

Jan. 30, 1945.　　　G. ASSET ET AL　　　2,368,093
MEASURING APPARATUS
Filed Sept. 3, 1943　　　6 Sheets-Sheet 6
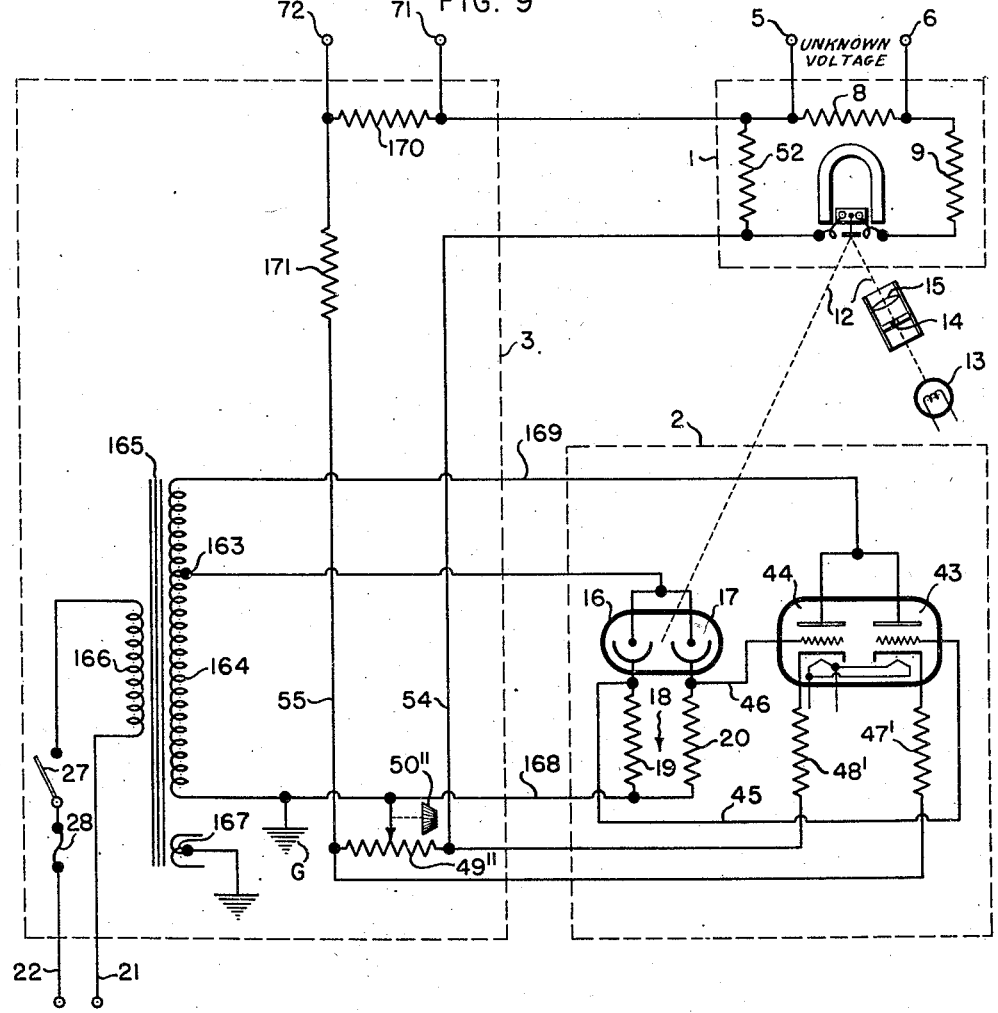
INVENTORS.
GABRIELLE ASSET
FRED J. CURRAN
BY　WALTER P. WILLS
ATTORNEY.

Patented Jan. 30, 1945

2,368,093

UNITED STATES PATENT OFFICE 2,368,093

MEASURING APPARATUS

Gabrielle Asset, Fred J. Curran, and Walter P. Wills, Philadelphia, Pa., assignors to The Brown Instrument Company, Philadelphia, Pa., a corporation of Pennsylvania Application September 3, 1943, Serial No. 501,056

30 Claims. (Cl. 171—95)

The present invention relates to systems involving the measurement of small electric potentials and their utilization for control purposes. The invention is especially useful in measuring and/or recording the minute unidirectional potentials produced by a spectrometer employed to apply infra-red spectra to the identification of chemical compounds, and in particular, to petroleum analysis.

A primary object of the invention is to provide a highly sensitive and stable arrangement for continuously measuring and/or recording extremely small unidirectional electric potentials.

The value of infra-red spectroscopy in chemical analysis and in control procedures is becoming recognized by the industries, particularly the petroleum industry, because of its unique ability to differentiate between isomeric and other closely related chemical compounds and also because of its speed and sensitivity. One known form of infra-red spectrograph is provided with a thermocouple or thermopile which is subjected to the infra-red radiation and produces a unidirectional potential in accordance with the molecular structure of the substance under analysis. The unidirectional potential so derived is exceedingly minute, however, and this factor presents a serious problem which must be overcome if the spectrograph is to be successfully employed. The problem is concerned with the measurement of that minute potential.

Attempts have been made to employ the quadrant electrometer, which is capable of detecting currents as low as $10^{-15}$ amperes, for this purpose, but the difficulty of handling this instrument renders it unfit for use in industrial research or control where the measurement of such small currents would be of value.

Attempts have also been made in the prior art to accomplish such measurements by D. C. vacuum tube amplifiers. While the prior art vacuum tube amplifiers are more convenient to use in practice than a quadrant electrometer, the usefulness of vacuum tube amplifiers has been limited by their notorious instability. The primary causes of instability of D. C. vacuum tube amplifiers are changes in vacuum tube characteristics, changes in tube filament emissions, poor contacts, mechanical vibration, inadequate shielding, changes in E. M. F. of the sources of voltage supply, and temperature and humidity effects. These variable and unpredictable factors cause troublesome drifts and erratic operation of the indicating or recording instrument. A satisfactory solution for the elimination of these bothersome factors is difficult of attainment and has not been disclosed in the prior art although prior art workers have made efforts to arrive at such a solution. Either the drift and bothersome fluctuations have not been eliminated by the proposed prior art arrangements, or an inordinately long "warm-up" period, in some instances of the order of several hours, has been required for the prior art apparatus to become stabilized. This has limited the use of such apparatus to highly skilled operators, and moreover, has materially restricted the field of use thereof.

Accordingly, it is an object of the invention to provide an improved arrangement for measuring minute unidirectional potentials having a sensitivity which is at least comparable to the prior art apparatus and has the added and important advantages of being entirely free from drift and troublesome fluctuations and of requiring only a short "warm-up" time. It is an object of the invention also to provide such an improved arrangement which is not appreciably influenced by conditions such as vibration, humidity and temperature. It is a further object of the invention to provide such an improved arrangement which is capable of providing a continuous indication and/or record of the chemical analysis of the substance under measurement.

The various features of novelty which characterize our invention are pointed out with particularity in the claims annexed to and forming a part of this specification. For a better understanding of the invention, however, its advantages and specific objects attained with its use, reference should be had to the accompanying drawings and descriptive matter in which we have illustrated and described preferred embodiments of the invention.

Of the drawings:

Fig. 1 is a diagrammatic arrangement in block form of unidirectional potential measuring apparatus according to the present invention;

Fig. 3 illustrates the relation of the photoelectric cells and the light beam;

Fig. 9 illustrates another modification of the said measuring circuit, pre-amplifier unit, and power and control unit.

In Fig. 1 we have illustrated, more or less diagrammatically and in block form, the improved apparatus of the present invention for measuring and indicating or recording the variations in magitude of exceedingly minute unidirectional potentials which, for example, may be of the order of a fraction of a microvolt. Referring to Fig. 1 it will be noted that the measuring apparatus is comprised of four units which are connected by cables. The said units comprise a measuring circuit 1, a pre-amplifier unit 2, a power and control unit 3, and a recorder 4.

Figure 2:
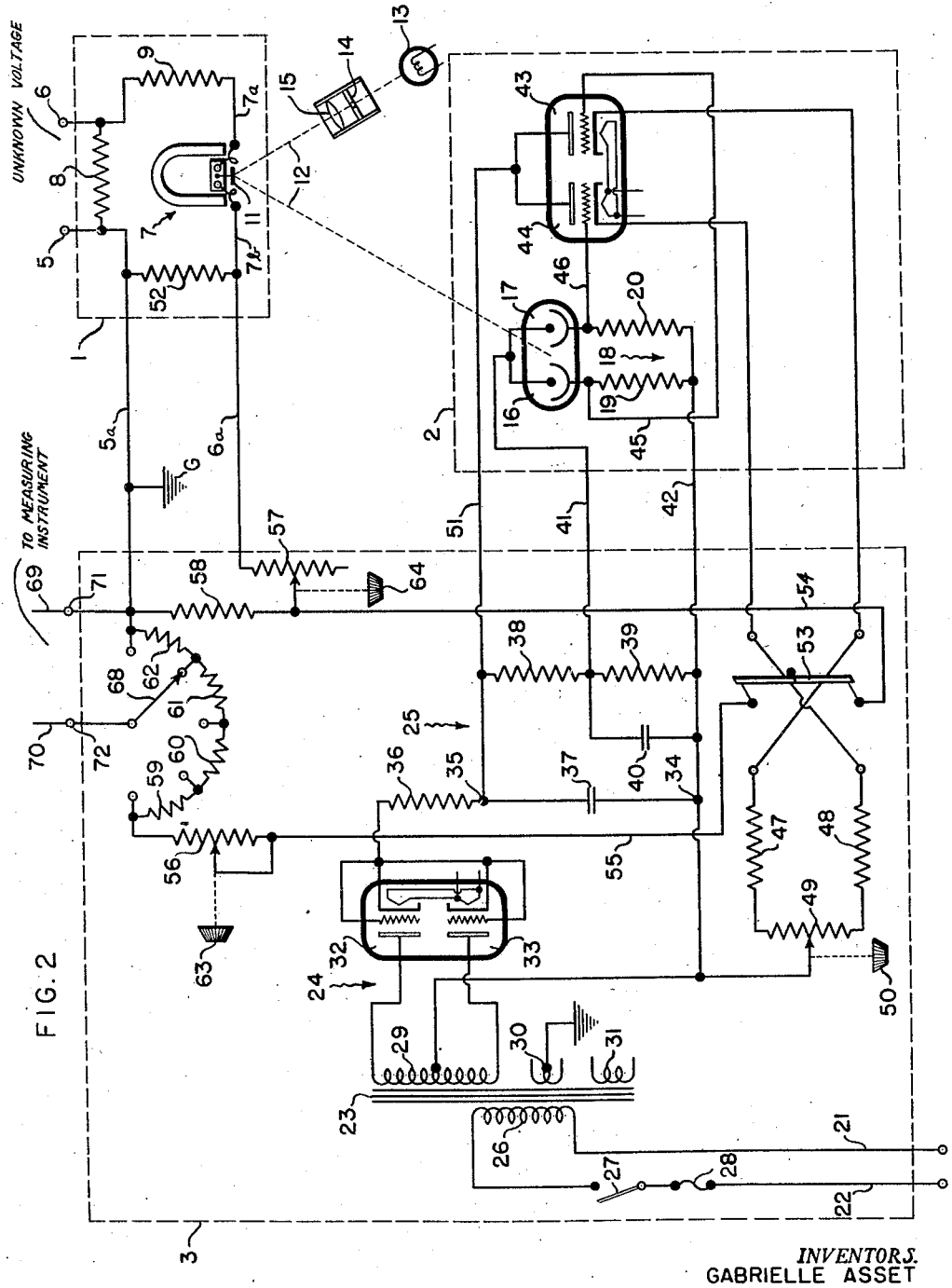
Fig. 2 is a schematic wiring diagram of the measuring circuit, the pre-amplifier unit, and the power and control unit of the arrangement of Fig. 1.

The measuring circuit 1 is provided with a pair of terminals 5 and 6 to which the small potential source under measurement is applied, and which are connected by a resistance 8 as may be seen in Fig. 2. Terminal 5, as shown, is grounded at G. The measuring circuit also includes a sensitive mirror galvanometer 7 and a resistance 9 connected in series. The galvanometer 7 preferably is of the suspension type having mechanical restoring torque. Galvanometer 7 may be of a commercially available type having a 2.7-second period, 20.5 ohms internal resistance, 18 ohms critical damping resistance, and a sensitivity of 0.19 microvolt per millimeter at one meter. Resistances 8 and 9 are so chosen as to provide a suitable amount of damping resistance in the galvanometer circuit. An adjustable screw 10 is provided on the galvanometer for facilitating adjustment of the angular position of the mirror 11. This adjustment screw, although a micrometer adjustment, affords only a rough calibration adjustment of the apparatus. A finer calibration adjustment of the apparatus is provided in the pre-amplifier 2, and will be described hereafter.

Mirror 10 of the galvanometer directs a beam of light 12 from a source 13 on to a pair of photoelectric cells 16 and 17 located in the pre-amplifier unit 2. Photoelectric cells 16 and 17 are positioned closely adjacent each other and preferably are contained in the same envelope as in the commercially available type CE-16. The light beam 12 is derived from a small lamp 13 which may desirably have a helical filament whereby the light beam will have a rectangular cross section. In furtherance of this end and to sharply define the image the light beam may be suitably focussed by an opaque shield 14 having an opening therein through which the beam passes, and is also focussed by a lens 15.

As seen in Fig. 2 the photoelectric cells 16 and 17 are connected in adjacent arms of an electrical bridge network 18 contained in the pre-amplifier 2. The remaining arms of the bridge network are comprised of fixed resistances 19 and 20 of equal value. Energizing voltage is supplied to the bridge network 18 from a well-filtered source of unidirectional voltage which is derived from alternating voltage supply conductors 21 and 22 by means of a transformer 23, a full wave rectifier 24, and a filter 25. Parts 23, 24 and 25 are all located within the power and control unit 3.

Transformer 23 is provided with a line voltage primary winding 26 which is connected to the alternating current supply lines 21 and 22 through a manually operable switch 27 and a fuse 28, and also is provided with a high voltage secondary winding 29 and low voltage secondary windings 30 and 31.

Rectifier 24 includes a pair of diode sections 32 and 33 which preferably are contained within a single envelope, and for example, may comprise the triode sections of a type 7N7 tube connected as diodes. The heater filaments of diode sections 32 and 33 are connected in parallel to the transformer secondary winding 31 and receive energizing current therefrom. When a type 7N7 tube is employed in rectifier 24, the transformer 23 is designed to supply 6.25 volts at the terminals of secondary winding 31 and thereby to the parallel connected heater filaments.

The cathode and control electrode elements of the sections 32 and 33 are connected together, as shown, so that these triodes are utilized as diodes. The anodes of the diodes are connected to opposite terminals of the high voltage transformer secondary winding 29 and the rectified current is applied to the input terminals of the filter 25. A center tap on the transformer secondary winding 29 is connected to the negative input terminal 34 of the filter and the positive terminal 35 of the filter is connected through a fixed resistance 36 to the cathodes of the diodes 32 and 33, which cathodes are connected together.

Filter 25 includes a condenser 37 which is connected between the input terminals 34 and 35 and also includes a pair of series connected resistances 38 and 39 connected in shunt to condenser 37. A condenser 40 is connected in parallel with the resistance 39 for providing additional filtering of the unidirectional potential drop across that resistance. This potential is impressed on the energizing terminals of the bridge network 18. Thus the positive terminal of resistance 39 is connected by a conductor 41 to the anodes of photoelectric cells 16 and 17 which are connected together and the negative terminal of resistance 39 is connected by a conductor 42 to the point of engagement of resistances 19 and 20. In this manner a unidirectional potential substantially free from ripple is impressed on the energizing terminals of the bridge network 18.

When the potential impressed on the galvanometer 7 is zero, the light beam 12 of rectangular cross section falls equally on the cathodes of both photoelectric cells 16 and 17, the light beam preferably being so related to the cathodes of the photoelectric cells that the longer edge of the rectangular beam is parallel to the adjacent edges of the photoelectric cathodes as is shown in Figure 3. With this arrangement only slight deflection of the light beam, and thereby of the galvanometer mirror, is required to cause the beam to move off one photoelectric cathode and thus decrease to substantially zero the illumination of that cathode and to simultaneously effect a substantial increase in the illumination of the other photoelectric cathode.

By virtue of the fact that the space currents of the photoelectric cells vary directly with the illumination of the cathodes, and since the cathode circuits of the cells contain equal resistances, the potential of one photoelectric cathode will rise while the potential of the other photoelectric cathode will drop. Accordingly, a unidirectional potential difference of one polarity or the other depending upon which photoelectric cathode is more illuminated is established between the two photoelectric cathodes in accordance with the angular position of the galvanometer mirror. This potential difference is amplified by means including a pair of electronic valves 43 and 44 which have been shown as triodes and preferably are contained in the same envelope, and for example, may desirably comprise the triode sections of the commercial type 7N7 tube. To this end the photoelectric cathodes 16 and 17 are connected directly to the control electrodes of the triodes 43 and 44, respectively, whereby each cathode individually regulates the potential of one of the control electrodes. Specifically, the cathode of photoelectric cell 16 is connected by a conductor 45 to the control electrode of triode 43 and the cathode of cell 17 is connected by a conductor 46 to the control electrode of triode 44. The cathodes of the triodes 43 and 44 are connected through fixed load resistances 47 and 48 and an adjustable potentiometer resistance 49 to the negative side of the unidirectional potential derived from rectifier 24 and filter 25, and accordingly, to the point of engagement of the resistances 19 and 20. The potentiometer resistance 49 is manually adjustable as by manipulation of a knob 50 and is provided for the purpose of adjusting the cathodes of triodes 43 and 44 to the same potential. Preferably, the resistance 49 and knob 50 are located in the power and control unit 3. The resistances 47 and 48 desirably may also be located therein.

Unidirectional energizing voltage substantially free from ripple is supplied to the output circuits of the triodes 43 and 44 from the supply lines 21 and 22 through the rectifier 24 and filter 25. Specifically, the anodes of triodes 43 and 44 are connected together and by a conductor 51 to the positive terminal of the filter 25. As previously noted, the cathodes of triodes 43 and 44 are connected to the negative terminal of the filter through the load resistances 47 and 48 and the potentiometer resistance 49. The heater filaments of triodes 43 and 44 are connected in parallel and receive energizing current from the transformer secondary winding 30, a center tap of which is grounded.

Within the operating range of the triodes 43 and 44, the space currents thereof will vary directly with the potentials impressed on their control electrodes, that is, the potential difference between each control electrode and its associated cathode, and any change in control electrode potential will produce an appreciable "in phase" change in the potential of the associated cathode. The cathodes of triodes 43 and 44 are initially balanced to the same potential by means of the potentiometer resistance 49 and knob 50. A displacement of the light beam 12, however, will cause the potential of one cathode to be increased in the positive direction from the original condition while the other cathode will be driven negative. Which triode cathode goes positive and which goes negative is determined by the direction of deflection of the light beam. For example, when the illumination of the photoelectric cell 16 is increased and that of photoelectric cell 17 is decreased the control electrode of triode 43 will be driven in the positive direction and that of triode 44 will be driven in the negative direction. Consequently, the space current in triode 43 will increase to cause the cathode potential thereof to increase while the space current in triode 44 will decrease to cause the cathode potential of the latter to decrease.

The potential difference so created between the cathodes of the triodes 43 and 44, or at least a portion thereof, is impressed on a resistance 52 in the measuring circuit 1 by means of a reversing switch 53 and conductors 54 and 55. Whether the potential impressed on resistance 52 opposes or aids the unknown potential impressed on the terminals 5 and 6 is determined by the position of the reversing switch 53, which, as shown, is a double pole-double throw switch. This switch reverses the connection of the resistance 52 to the cathodes of triodes 43 and 44.

Thus the source of minute potential to be measured is arranged in series with a fixed resistance 52 which is traversed by space current supplied by the triodes 43 and 44 the input circuits of which are controlled in accordance with the state of balance of the electrical bridge network 18, and thereby in accordance with the relative illumination of the photoelectric cells 16 and 17 which, in turn, is regulated according to the angular position of the movable element or mirror 11 of the galvanometer 7. This measuring circuit arrangement including the source of minute potential under measurement, the resistance 52 and the galvanometer 7 in series responds to unbalanced current flow in the galvanometer in the case where the potential produced across resistance 52 opposes the potential source under measurement and automatically regulates the state of balance of the bridge network 18, and hence the potentials applied to the control electrodes of triodes 43 and 44, as to restore and maintain a condition of electrical equilibrium in the measuring circuit 1 by virtue of the change in space current through the triodes 43 and 44 resulting from the control electrode potential changes.

Stated differently, the operation of the system in this case is such that when a potential is impressed on the terminals 5 and 6, the galvanometer deflects to change the relative illumination of the photoelectric cells 16 and 17 and consequently to unbalance the bridge network 18. This causes the triodes 43 and 44 to feed an opposing current back into the galvanometer circuit through the resistance 52 to thereby restore the original state of balance.

It is noted that when the galvanometer 7 has some restoring torque which tends to cause the galvanometer deflecting element to assume a predetermined position when no current flows through the galvanometer that the precise original state of balance of the measuring circuit will not be restored. The original state of balance of the measuring circuit will be almost restored, however, and by way of example, may be 90% restored. Some slight unbalance, in this case 10%, is required in order to offset the mechanical restoring torque of the galvanometer. If it is desired to have the original state of balance of the measuring circuit 100% restored, this result may be accomplished by utilizing a galvanometer having no mechanical restoring torque such as a pivot type galvanometer. Pivot type galvanometers are not suitable where extremely high sensitivity is an essential consideration, however, and a suspension type galvanometer with its attendant mechanical restoring torque, albeit of small magnitude, must be employed. Therefore, when the full scale range of the source of minute potential under measurement is of the order of one microvolt, the galvanometer must be of the suspension type, precluding complete restoration of the original state of balance of the measuring circuit 1 upon a change in the potential under measurement.

By way of example, it is noted that when the resistance 52 has a value of 0.06 ohm and a potential of one microvolt is impressed on the measuring circuit terminals 5 and 6, the galvanometer 7 deflects the light beam sufficiently to produce a current of $15 \times 10^{-6}$ amperes through the resistance 52. This current produces in the feedback resistance 52 a potential drop of $$0.06 \times 15 \times 10^{-6} = 0.9$$

microvolt in opposition to the potential of one microvolt under measurement. Hence, the effective unbalance of the measuring circuit is 1−0.9 or 0.1 microvolt, and consequently, the deflecting element of the galvanometer 7 is given only one-tenth the angular rotation it would have been given if the feedback circuit were not provided.

By means of this arrangement the usable range of the galvanometer is greatly extended without requiring the use of shunt resistances. Furthermore, since the feedback circuit is substantially undamped, its effect is instantaneous whereby the speed of measurement of the system is greatly increased. The feedback system also eliminates to a considerable extent the effects of vibration and other mechanical variations on the galvanometer. All of these factors contribute to a desired result, namely, the production of a current, herein the feedback circuit, which is proportional to the minute potential under measurement but is amplified to such a magnitude that a relatively insensitive meter or recorder can be used to measure it.

It is noted that by reversing the direction of the feedback current through the resistance 52, as by adjustment of the switch 53 to its other position, a considerable increase in sensitivity of the system may be obtained. This increase in sensitivity is obtained at the expense of increasing the time required to measure a change in the unknown potential, however, and in addition, appreciably diminishes the usable range of the apparatus. Thus, the feedback current must be made so small that it cannot gain control and swing the light beam 12 entirely off one of the photoelectric cathodes.

The provision of the reversing switch 53 is also advantageous, even when the only contemplated manner of operation of the system is to have the feedback effect oppose the unknown potential under measurement, in that the connection of the apparatus to accomplish this result is thereby facilitated. That is to say, the provision of switch 53 eliminates the necessity for making certain that the direction of the feedback current is proper to oppose the unknown potential. If, after the circuit has been connected together, the feedback current is not in the proper direction, adjustment of the reversing switch 53 from one position to the other is the only change required to make the feedback current flow in the desired direction.

As illustrated in Fig. 2, the feedback circuit includes resistances 56, 57, 58, 59, 60, 61 and 62 in addition to the resistance 52. The resistance 56 is an adjustable resistance of high value and is employed to dampen out surges which may be set up by the vibration of the galvanometer 7. Resistance 56 also attenuates to some extent the magnitude of the feedback current. Accordingly, the resistance 56 is adjusted as by manipulation of knob 63 so as to provide only that amount of resistance which is required to stabilize the system whereby the attenuation is maintained at a minimum value. This control knob 63 is designated "Damping" on the power and control unit 3 in Fig. 1.

Resistance 57, in conjunction with resistance 58, determines the amount of total feedback current which is introduced into the measuring circuit. As shown, resistance 57 is adjustable by means of a knob 64 while resistance 58 is fixed. When resistance 57 is adjusted to zero, the feedback resistance 52 is traversed by substantially all of the feedback current. On the other hand, when resistance 57 is adjusted to its maximum value, the feedback resistance is traversed by less than 5% of the feedback current in a practical operative embodiment of the invention. The control knob 64 is labeled "% feedback" on the power and control unit in Fig. 1.

The potentiometer resistance 49 is employed to adjust the feedback current to zero when the photoelectric cathodes are not illuminated by the light beam 12. The knob 50 which is provided to adjust potentiometer resistance 49 is designated "Zero adjustment" in the diagram of the power and control unit in Fig. 1. Accordingly, when the photoelectric cathodes are subsequently illuminated by the beam when the unknown potential impressed on terminals 5 and 6 is zero, the feedback current will remain at zero if the light beam 12 is properly divided on the photoelectric cathodes. This condition may be roughly attained by manipulation of knob 10 which operates to adjust the angular position of mirror 11. Means for moving the photoelectric cells transversely to the light beam 12 are also provided to accomplish a fine adjustment of the feedback current to zero when the unknown potential is zero. This means comprises means to laterally adjust the whole preamplifier chassis and comprises an anchoring body shown at 65 upon which a plate 2a rigid with the said chassis is slideably mounted, and a cooperating screw 66 which is provided with a knob 67, as seen in Fig. 1, for slideably adjusting the plate 2a and thereby chassis 2 relatively to the anchoring body 65. Thus, if the light beam is not in its proper position to provide zero feedback current with the unknown potential at zero, the pre-amplifier chassis and thereby the photoelectric cells may readily be shifted laterally by means of manipulating the knob 67.

Resistances 59, 60, 61 and 62 are provided in conjunction with a selector switch 68 for the purpose of facilitating ready adjustment of the amount of resistance shunting the input conductors 69 and 70 leading to the recorder 4 from the power and control unit output terminals 71 and 72, as seen in Fig. 1. The selector switch 68 is designated "Range" on the power and control unit in Fig. 1. The recorder 4 is illustrated in detail in Fig. 5.

By way of example only, it is noted that when the unknown potential under measurement has a range of 0.8 microvolt and the range of the recorder 4 is 0.5 to 4.5 millivolts, the circuit components of the measuring circuit 1, the pre-amplifier 2 and the power and control unit 3 may desirably have the following values:

| | | |
|---|---|---|
| Resistance 8 | ohm | 1 |
| Resistance 9 | do | 21 |
| Resistance 19 | megohms | 5 |
| Resistance 20 | do | 5 |
| Resistance 36 | do | 0.1 |
| Resistance 38 | do | 1 |
| Resistance 39 | do | 0.5 |
| Resistance 47 | ohms | 10,000 |
| Resistance 48 | do | 10,000 |
| Resistance 49 | do | 15,000 |
| Resistance 52 | do | 0.06 |
| Resistance 56 | do | 100,000 |
| Resistance 57 | do | 100 |
| Resistance 58 | do | 5 |
| Resistance 59 | do | 150 |
| Resistance 60 | do | 100 |
| Resistance 61 | do | 50 |
| Resistance 62 | do | 50 |
| Condenser 37 | mfd | 20 |
| Condenser 40 | mfd | 10 |

In the pre-amplifier unit 2 the tube containing photocells 16 and 17 is preferably located closely adjacent the tube housing the triodes 43 and 44. With such arrangement, it is possible to employ short connecting leads between the photoelectric cathodes and the triode control electrodes thus minimizing any tendency to leakage currents and/or pick-up of extraneous currents. Furthermore, in order to minimize adverse effects tending to arise as a result of the responsiveness of the photoelectric circuit to vibration to manual adjustments, all of the electrical controls are located in the power and control unit 3 rather than in the pre-amplifier unit. For very fine adjustments of the light beam relatively to the photoelectric cells 16 and 17, however, the whole pre-amplifier chassis is shifted by means of the adjusting screw 67. The power and control unit may conveniently have all of the electrical controls located on a front panel as shown in Fig. 1.

The conductors 5a and 6a connecting the power and control unit 3 and the measuring circuit 1 preferably are included in a cable and well shielded from magnetic and electrostatic fields inasmuch as such fields, even weak fields, tend to induce potentials in the conductors 5a and 6a in excess of the minute potential under measurement. The cable including conductors 5a and 6a, in addition, is made rigid with the units 1 and 3 in view of the fact that motion of this cable through the earth's magnetic field tends to induce appreciable stray potentials in the conductors 5a and 6a.

Similar precautions as to shielding and rigid support are also taken in regard to the connection of the minute potential under measurement to the measuring circuit. When the measuring apparatus of the present invention is employed in conjunction with an infra-red spectrograph, the terminals 5 and 6 are ordinarily connected to the terminals of a thermopile in the spectrographic analysis equipment.

The cable connecting the power and control unit 3 to the recorder 4 is in a relatively insensitive circuit, and therefore, no especial precautions to eliminate extraneously induced currents need be taken.

Figure 4:
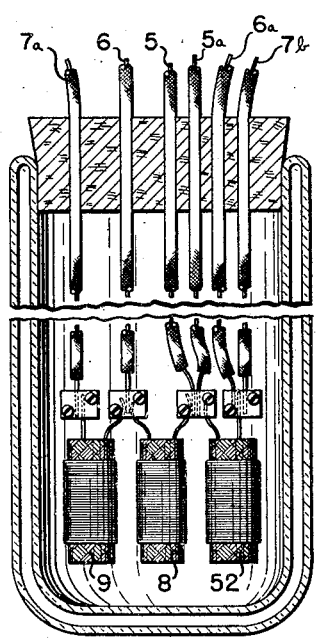
Fig. 4 illustrates in detail the arrangement of the measuring circuit of Fig. 1 in a thermos bottle.

In order to minimize extraneous potentials in the measuring circuit 1 which may be introduced as a result of thermoelectric effects at the circuit connections, the resistances 8, 9 and 52 are made of copper and all of the connections in the measuring circuit are copper to copper, the joints preferably being held together by parallel copper clamps, and with the exception of the galvanometer 7, the entire measuring circuit 1 may desirably be contained in a thermos bottle, as shown in Fig. 4. In this manner substantially all sources of extraneous thermal potentials are eliminated, and furthermore, the tendency of any remaining sources to generate potentials is minimized by virtue of the action of the thermos bottle in maintaining all parts of the measuring circuit at approximately the same temperature.

This arrangement of the measuring circuit 1, pre-amplifier 2, and power and control unit 3 thus not only is extremely sensitive and capable of detecting minute potentials which may be impressed on the terminals 5 and 6, but is highly stable, being free from drift and troublesome fluctuations for all practical purposes. The provision of the well-filtered supply of undirectional voltage for energizing the photoelectric cells 16 and 17 and also the electronic valves 43 and 44 reduces to a minimum the tendency to introduction of stray alternating potentials in the measuring circuit. In addition, the use of the balanced triode arrangement of triodes 43 and 44 eliminates adverse effects which would otherwise be produced as a result of changes in the emission of the cathodes or other changes in the triode characteristics which tend to take place. Since the two triodes are contained in a single envelope, any such changes which tend to take place will occur in both triodes to approximately the same extent, and accordingly, will be balanced out. The balanced triode arrangement also has the added advantage of tending to balance out any changes in the magnitude of the applied energizing voltage from rectifier 24 and filter 25 which may take place as a result of variation in the alternating voltage of the supply mains 21 and 22. The use of the balanced triode arrangement, therefore, eliminates the necessity of providing expensive and complicated voltage regulator devices to maintain the voltage constant. A further advantage of the highly stable arrangement of our invention is that only a short "warm up" time, namely the time required for the cathodes of triodes 32, 33, 43 and 44 to heat to their operating temperatures, is required for the system to stabilize itself and become practically free of drift and other troublesome effects.

Figure 5:
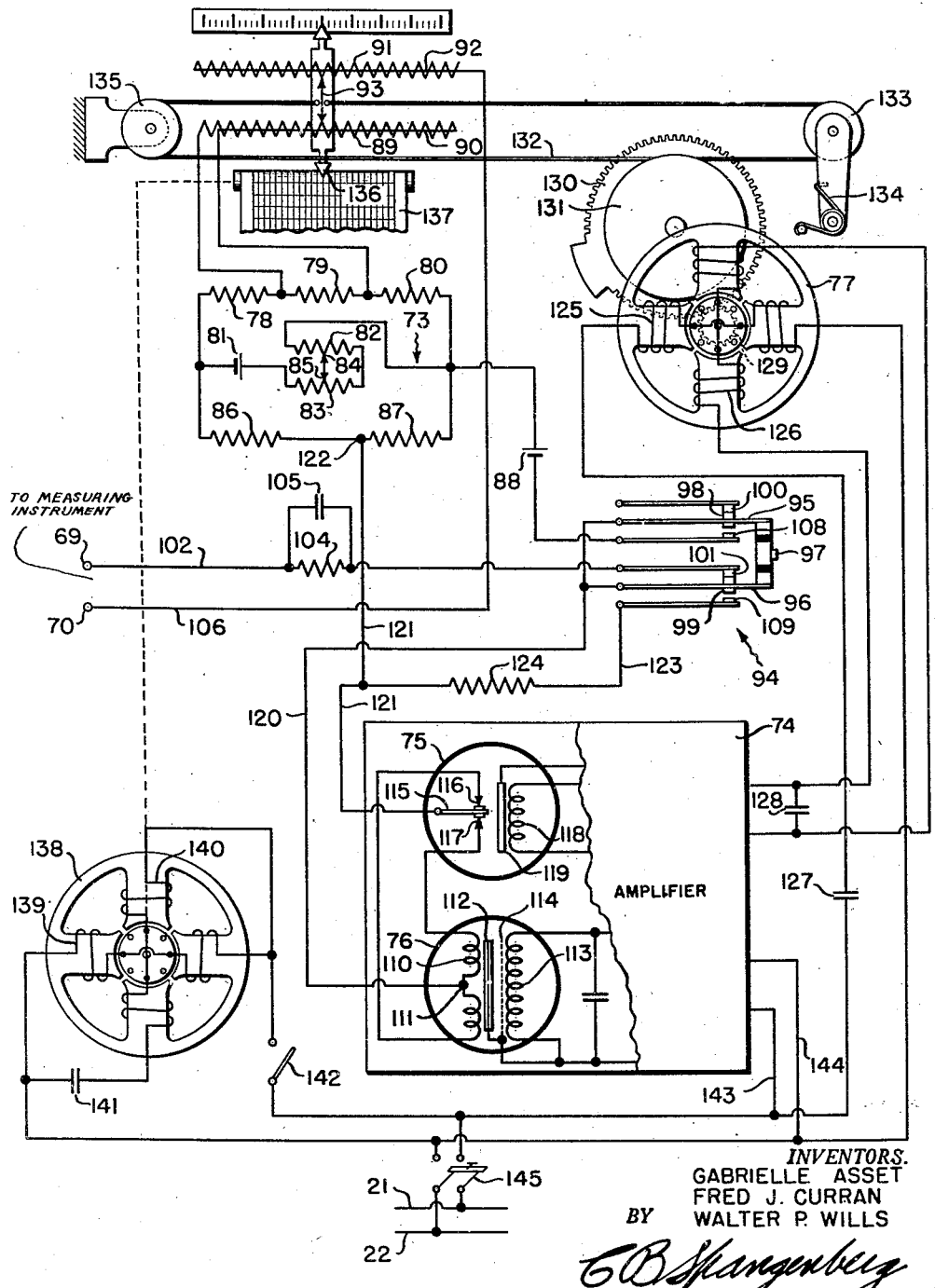
Fig. 5 is a schematic wiring diagram of the recording appartus of the Fig. 1 arrangement.

In Fig. 5 we have illustrated in detail a preferred form of recorder 4 for recording the magnitude and the variations in magnitude of the unknown minute potential impressed on the input terminals 5 and 6 of the measuring circuit 1. The recorder 4 disclosed in Fig. 5 includes a self-balancing potentiometric network 73 which is arranged to produce a potential of known magnitude between its input terminals 69 and 70. This potential of known magnitude is compared to the potential produced between the output terminals 71 and 72 of the power and control unit 3, and is variable by automatic means to be described so as to be exactly equal and opposite, and to thereby balance the potential between terminals 71 and 72 at all times. Upon unbalance of these opposed potentials a unidirectional current of one polarity or of opposite polarity depending upon the direction of unbalance is produced. This unidirectional current is applied to the input terminals of an amplifier unit 74 having a vibrator or equivalent device designated at 75 and a transformer designated at 76 which are connected to an electronic amplifying system located in the unit, but not shown.

The unidirectional current supplied to the amplifier 74 is converted by the vibrator 75 into a pulsating current of one phase or of opposite phase relatively to the voltage of the alternating current supply mains 21 and 22 depending upon the sense of unbalance of the potentiometric network. This pulsating current is translated by the transformer 76 into an alternating potential of corresponding phase and the latter is amplified by a vacuum tube amplifier which may take the form of that shown in the copending application of Walter P. Wills, filed December 1, 1941, and having Serial No. 421,173. The amplified quantity is employed to selectively control the rotation of a reversible electrical motor generally designated at 77 for rotation in one direction or the other according to the phase of the derived pulsating current. Motor 77 serves to operate a slidewire assembly to rebalance the potentiometer system and also serves to move an indicating and recording mechanism which is described hereafter.

The potentiometric network 73 includes three resistances 78, 79 and 80 connected in series. These resistances are formed of material having substantially a zero temperature coefficient of resistance and are employed for calibration purposes. Connected in parallel to these resistances is a battery 81, which may be in the form of a dry cell, and a dual vernier rheostat comprising resistances 82 and 83 and electrically connected sliding contacts 84 and 85 which engage the resistances 82 and 83, respectively. The rheostat may be operated by any suitable type of knob, not shown, which desirably has a direct mechanical connection with the contact 85 and a lost motion connection with the contact 84. Upon initial movement of the knob the contact 85 is first moved and then the contact 84 is moved thereby providing a vernier adjustment.

Also connected in parallel with the resistances are two series connected resistances 86 and 87. The resistances 86 and 87 are preferably both composed of manganin having a substantially zero temperature coefficient of resistance. The resistance 87 is provided for standardization purposes and has a resistance value such that the potential drop across it is of the same magnitude as the potential produced by a standard cell 88.

The potentiometric network 73 also includes a slidewire assembly consisting of a coil 89 which is wound around and is insulated from a core 90. Cooperating with the slidewire is a collector bar 91 which is wound around a core 92. The slidewire 89 and the collector bar 91 are electrically connected by a sliding contact 93 which is moved by the motor 77 as required to restore and maintain the potentiometric network 73 balanced. The terminals of the slidewire 89 and its core 90 are connected in parallel to the resistance 79.

A double-pole double-throw switch 94 is connected into the potentiometric network 73 and is utilized to perform two functions, namely to adjust the potentiometric network to its normal operating condition, and to standardize the potentiometric network. This switch comprises a plurality of switch arms 95 and 96 which are provided with contacts 98 and 99, respectively, which contacts are adapted to engage respectively contacts 100 and 101 carried by other arms of the switch assembly. The contact 101 is connected by conductor 102 to the potentiometer input terminal 69. Conductor 102 has inserted therein a resistance 104 which is shunted by a condenser 105. Resistance 104 and condenser 105 are provided for the purpose of minimizing any tendency the motor 77 and the associated potentiometer rebalancing mechanism may have to overshoot the precise position of potentiometric rebalance and thereby makes possible rebalancing of the potentiometric network at high speed without the occurrence of hunting as is explained in the Harrison and Wills Patent 2,300,742 issued on November 3, 1942. The other potentiometric input terminal 70 is connected by a conductor 106 to the end terminal of the collector bar 92. Switch 94 is shown in the normal operating position of the potentiometer. When the switch 94 is in the standardizing position, the contact 98 engages a contact 108 and the contact 99 engages a contact 109. Contacts 108 and 109 are carried by additional arms of the switch assembly.

The transformer 76 of the amplifier 74 includes a primary winding 110 having a center tap 111. Primary winding 110 is wound on a core structure 112 on which a secondary winding 113 having its terminals connected to the amplifier is also wound. A shield 114 is provided between the primary and secondary windings. All of the transformer parts are preferably located in a suitable housing which acts to shield the primary and secondary windings from external fields.

Vibrator 75 may be of the type disclosed in the copending application of Frederick W. Side, Serial No. 421,176, filed December 1, 1941, and comprises a vibrating reed 115 which normally engages contacts 116 and 117 but which during its vibration separates first from contact 116 and then from contact 117 but is in engagement with one or the other of the contacts at all times. Reed 115 is vibrated under the influence of a winding 118 that is connected through conductors not shown to the alternating current supply mains 21 and 22. A permanent magnet 119 is associated with the reed 115 and is provided for polarization and synchronizing purposes so as to keep the vibrations of the reed 115 in step with the alternations of the voltage supply mains 21 and 22. This structure is also enclosed in a suitable housing which also may serve the purpose of shielding the vibrating reed 115 and its associated contacts 116 and 117 from extraneous disturbing quantities.

One end of the primary winding 110 of the transformer 76 is connected to the contact 116 of the vibrator while the other end is connected to the vibrator contact 117. The center tap 111 is connected by means of a conductor 120 with the contacts 98 and 99 of the switch 94. Vibrating reed 115 is connected by means of a conductor 121 to the point of engagement 122 of the potentiometer resistances 86 and 87. Thus a series circuit is completed from the potentiometric input terminals 69 and 70 through the potentiometric network from collector bar 92 to point 122, vibrator 75 and the alternate halves of the primary winding 110 of transformer 76 as the reed 115 of the vibrator vibrates.

From time to time it may become necessary to standardize the potentiometric network by readjusting the contacts 84 and 85 to compensate for variations in the voltage of the battery 81. The standard cell 88 is utilized to accomplish this result. When the switch 94 is in its lower or standardizing position, the standard cell is connected in circuit with the potentiometer resistance 87 through a circuit which may be traced from the right end terminal of resistance 87 to switch contacts 108, 98, and 99, 109, conductor 123, conductor 121, vibrator 75, transformer 76 and conductor 120 to the left end terminal of resistance 87. A resistance 124 is connected in shunt to the vibrator 75 and transformer 76 for the purpose of desensitizing the amplifier 74 while the instrument is in its standardizing condition. The standard cell 88 is so connected in this circuit that its potential opposes the potential drop across the resistance 87. When the potentiometric network 73 is in need of a standardizing adjustment, inequality of the opposed potentials will exist, and consequently, an unbalanced current will flow through the circuit traced. This current flow is translated by the vibrator 75 and transformer 76 into an alternating potential of one phase or the opposite phase depending upon the sense of the inequality and is amplified by the electronic amplifying means in the amplifier unit 74 and utilized to control the operation of motor 77. Rotation of the motor 77 provides a visual indication that a standardizing adjustment of the potentiometric network is required. Such adjustment may be effected by manually adjusting the dual vernier rheostat contacts 84 and 85 along the length of their associated resistances 82 and 83 until the motor stops rotating. This provides an indication that the potentiometric network has been properly standardized. If desired, a separate amplifier unit 74 and reversible electrical motor 77 may be provided for continuously adjusting the dual vernier rheostat as is required to maintain the potentiometric network continuously standardized as is disclosed in the copending application of Walter P. Wills, Serial No. 480,579, filed March 25, 1943.

The reversible motor 77 is of the rotating field type and is provided with a power winding 125 and a control winding 126. The power winding 125 is connected to the alternating current supply mains 21 and 22 through a condenser 127 of suitable value. The control winding 126 is connected to the output terminals of the amplifier unit 74 and has a condenser 128 connected in parallel therewith. When the current flow through the control winding lags the current flow through the power winding, the motor rotates in one direction. When the current flow in the contol winding leads that in the power winding, motor rotation in the opposite direction is effected. When only the power winding is energized the motor remains at rest. The amplifier unit 74 supplies energizing current to the control winding of one phase or of opposite phase depending upon the polarity of the unbalanced unidirectional currents impressed thereon from the potentiometric network, and accordingly, controls the selective actuation of the motor for rotation in one direction or the other.

As is illustrated in the drawings, the shaft of motor 77 drives a pinion 129 that is disposed in engagement with a gear 130. Attached to, and movable with the gear 130 is a pulley 131 around which is wrapped an endless cable 132. The cable 132 is connected to the potentiometer rebalancing contact 93 so that as the motor rotates, the contact will be moved in one direction or the other to rebalance the potentimetric network in the manner above described. One end of the cable 132 runs over a pulley 133 which is pivotally mounted and biased by a spring 134 to take up the slack in the cable. The other end of the cable runs around a pulley 135.

A pen 136 is mounted on the carriage which carries the potentiometer rebalancing contact 93 and arranged in cooperative relation with a recorder chart 137 to thereby provide a continuous record of the adjustments of the potentiometer contact 93 which are required to maintain the potentiometric network balanced, and accordingly, to provide a record of the variations in the unknown potential applied to the terminals 5 and 6 of the measuring circuit 1. The chart 137 may be a strip chart, as shown, and is adapted to be driven in any convenient manner, as for example, by a unidirectional motor 138 through suitable gearing, not shown, so that a record of the variations in the unknown potential will be recorded as a continuous line on the chart. The chart driving motor 138 may be a rotating field motor of the same type as the motor 77. Motor 137 is provided with a winding 139 which is directly connected to the supply mains 21 and 22, and is provided with a winding 140 which is connected to the mains 21 and 22 through a suitable condenser 141. A switch 142 is connected in the energizing circuits to the chart motor so that the chart motor may be deenergized when desired.

The amplifier unit 74 is connected to and receives energizing current from the alternating current supply mains 21 and 22 through a pair of conductors 143 and 144. A double pole-single throw switch 145 is provided between the mains 21 and 22 and the amplifier unit 74 for disconnecting the latter from the supply mains when it is so desired. Preferably the switch 145 is so located that when it is thrown to deenergize amplifier 74 it also deenergizes chart motor 138.

Figure 6:
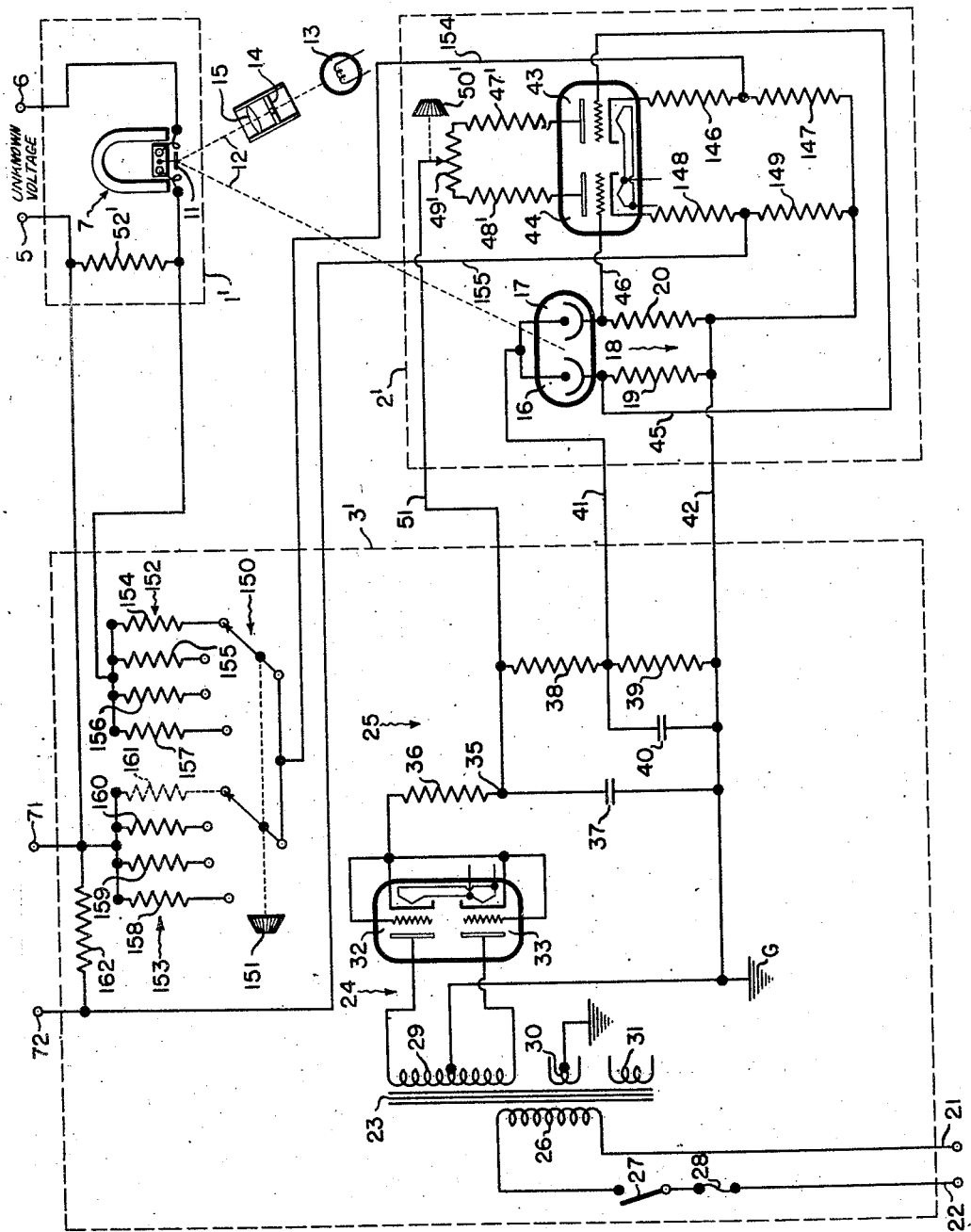
Fig. 6 illustrates a preferred embodiment of the measuring circuit, pre-amplifier unit, and power and control unit of the arrangement of Fig. 1.

In Fig. 6 we have illustrated more or less diagrammatically a preferred embodiment of the measuring circuit, preamplifier unit, and power and control unit of the arrangement of Figs. 1 and 2. The modification of Fig. 6 differs from the arrangement of Fig. 2 in regard to the location of the circuit connection to ground, the arrangement of the measuring circuit and the arrangement of the range changing switch employed. In addition, reversing switch 53 of Fig. 2 has been omitted in Fig. 6.

As will be noted by reference to Fig. 6, the connection to ground G of the circuit has been changed from the measuring circuit to the negative terminal of the full wave rectifier 24. In particular, the ground connection is made to the center tap on the high voltage winding 29 of the transformer 23. This change in the location of the ground connection of the apparatus provides the advantageous result of eliminating alternating current strays which tend to be extraneously introduced into the measuring circuit when the ground connection as provided in Fig. 2 is employed. While the exact reason for the tendency of an alternating current stray to be introduced into the measuring circuit of the Fig. 2 arrangement is not now known to us, it is believed to be due to the existence of leakage between the primary winding 26 and secondary winding 29 of the transformer 23. Ordinarily, one supply main 21 or 22 of a commercial alternating supply source is connected to ground, and therefore, there is a tendency in the arrangement of Fig. 2 for alternating current to pass from the grounded supply main through the transformer 23 and through the resistances and through the conductors 54 and 55 to the measuring circuit and to the recorder circuit and thereby back to ground. The presence of such alternating current strays in the measuring and recording circuits not only disturbs the operation of the measuring circuit 1 but in addition has the effect of slowing down the operation of the recorder. This slowing down action on the recorder is believed to be due to the fact that alternating current strays which may be impressed on the recorder input terminals 69 and 70 are translated by the vibrator 75 and transformer 76 into alternating currents in the transformer secondary winding 113 of twice the frequency of the extraneously introduced alternating current. For example, when the current supplied by the mains 21 and 22 is 60 cycle alternating current, the 60 cycle stray currents are converted into currents having a frequency of 120 cycles in the transformer secondary winding 113. These 120 cycle currents have little or no effect upon the operation of the reversible motor 77 of the recorder when they are small in magnitude, but when they become appreciable in magnitude they tend to produce a braking action on the motor 77 and thus operate to slow down the motor operation. Such a condition is intolerable when it is desired to record at high speed the variations in the minute unidirectional potential under measurement and may be readily overcome by utilizing the ground connection shown in Fig. 6. Referring to Fig. 6 it will be noted that any leakage currents which pass through the transformer 23 are immediately diverted to ground and are not permitted to pass through the recorder or the measuring circuits.

In order to maintain the measuring circuit, designated 1', of Fig. 6, as near to ground potential as possible, the potentiometer resistance provided to electrically balance the triodes 43 and 44 is located in the anode circuits of those triodes. Specifically, a resistance 47' is connected in the anode circuit of the triode 43 and a resistance 48' is connected in the anode circuit of the triode 44. An adjustable potentiometer resistance 49' is so arranged that variable portions thereof may be connected in the anode circuits of the triodes 43 and 44 as the potentiometer contact is moved as by means of a knob 50'. As shown, the potentiometer contact is connected by means of the conductor 51 to the positive terminal of the filter 25.

Feedback current from the output circuit of the triodes 43 and 44 to the measuring circuit 1' and to the recorder 4 is derived by means of the provision of resistances 146 and 147 in the cathode circuit of the triode 43 and resistances 148 and 149 in the cathode circuit of the triode 44. The resistances 146 and 148 are preferably of the same value as are also the resistances 147 and 149. The resistances 146-149 are provided in order to obtain a difference in potential from the cathode circuits of the triodes 43 and 44 which may be utilized to create a feedback current flow in the measuring circuit 1' and in the recorder 4. By virtue of this provision, the measuring circuit and the recorder float at some potential above ground determined by the magnitude of resistances 147 and 149 and the current flow through those resistances.

The range changing switch designated by the reference character 150 in Fig. 6 is preferred over the range changing provisions of the Fig. 2 arrangement in that all of the necessary adjustment for changing the range may be accomplished by means of the manipulation of a single knob shown at 151 while at the same time maintaining the potential drop across the input terminals 69 and 70 of the recorder 4 at the same value for all of the different ranges and also maintaining the feedback potential impressed on the measuring circuit 1' at a value approximately 90% of the unknown potential under measurement.

The range changing switch 150 includes a bank of resistances shown collectively at 152 and including resistances 154, 155, 156 and 157. The range changing switch 150 also includes a second bank of resistances shown collectively at 153 and including resistances 158, 159, 160 and 161. The resistance 161 is of high value and may desirably comprise the resistance of an air gap. For this reason the resistance 161 has been shown in dotted lines. The range depends upon the values of resistances 152 and 153 which are connected into the circuit. Both sets of resistances are connected into the circuit by means of the single selector switch 150 which is operated by the knob 151. When the selector switch 150 is in the position shown, all of the feedback current from the cathode circuits of the triodes 43 and 44 in the feedback conductors 154 and 155 flows through the resistance 154, the feedback resistance 52', the resistance 162 which is connected in shunt to the output terminals of the power and control unit 3 and thereby is connected in shunt to the recorder input terminals 69 and 70, and through the feedback conductor 155 to the cathode circuit of the triode 44.

The resistances 154—160 are preferably at least 100 ohms in value in order to make the contact resistance of the selector switch 150 small relatively to the values of the said resistances and also in order to minimize the effects of any thermoelectric potentials which may be introduced into the measuring and recording circuits as a result of the connection of the resistances 154—160 into the circuit. By making the resistances 154—160 large, a considerably smaller fraction of any thermoelectric potential in the feedback circuit appears across the feedback resistance 52' and across the resistance 162 shunting the recorder input terminals.

Figure 7:
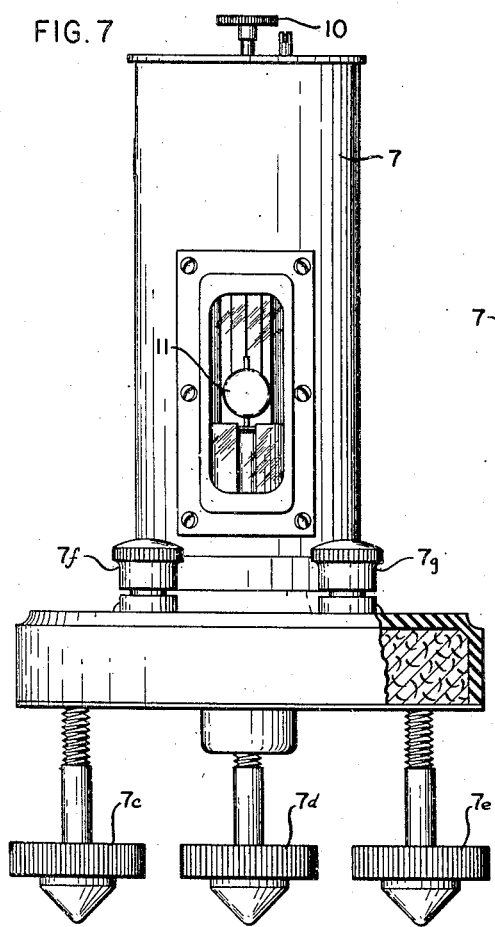
Figs. 7 and 8 illustrate in detail the arrangement of the galvanometer and measuring circuit resistances of Fig. 6.
Figure 8:
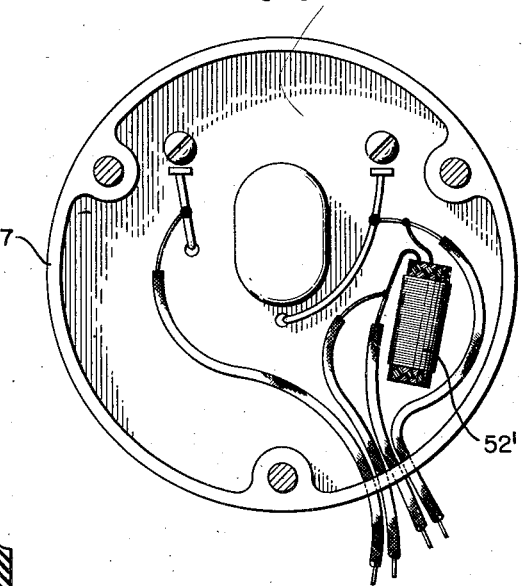

In Figs. 7 and 8 is illustrated in detail a preferred arrangement of the galvanometer 7 and the measuring circuit resistance 52'. The galvanometer 7 shown is of a commercially available type provided with levelling screws 7c, 7d and 7e and with binding posts 7f and 7g. The binding posts 7f and 7g are not employed in the arrangement of Fig. 6, however, but instead the connections to the galvanometer movable coil and also to the resistance 52' are made by means of soldered joints in order to minimize the effects of ambient temperature variations upon the operation of the apparatus. While the use of soldered joints tends to cause the introduction of a small thermal electromotive force into the measuring circuit, and therefore, theoretically are not as desirable as copper to copper connections, we have discovered that the stray thermal electromotive forces introduced into the measuring circuit become greater after a period of use of the apparatus when copper to copper connections are employed than when soldered joints are provided. This result is believed to be due to oxidation of the copper to copper connections. The resistance 52' preferably is non-inductively wound and, for example, may be a bifilary wound resistance of copper wound on a glass fibre core and preferably is of the type disclosed in the Wagner application, Serial No.

391,319, filed May 1, 1941, and issued into Patent 2,357,241 on August 29, 1944. In order to further minimize the effects of ambient temperature changes upon the operation of the apparatus, the resistance 52' is preferably packed in an insulating material such as felt or rock wool in the bottom of the galvanometer structure. With this arrangement sudden changes in ambient temperature are prevented from causing corresponding changes in the temperature of the resistance 52'. This construction accordingly tends to eliminate erratic fluctuations and consequent instability in the operation of the apparatus. When this construction is provided, it is not necessary to locate the measuring circuit resistance in the interior of a thermos bottle as shown in Fig. 4.

It has been determined experimentally that the arrangement of Fig. 6 is capable of continuously recording the variations in the unknown unidirectional potential applied to the terminals 5 and 6 of the measuring circuit as rapidly as the recorder 4 will operate. The drift produced in the apparatus is negligible. It has also been determined that four ranges; namely, 1 microvolt, 10 microvolts, 15 microvolts and 25 microvolts are obtainable by means of the provision of the single selector switch 150. By way of illustration only, it is noted that when the apparatus of Fig. 6 is arranged so as to provide these four ranges, the circuit components of the measuring circuit 1', the pre-amplifier 2' and the power and control unit 3' may desirably have the following values:

| | | |
|---|---|---|
| Resistance 19 | megohms | 5 |
| Resistance 20 | do | 5 |
| Resistance 36 | do | 0.1 |
| Resistance 38 | do | 1 |
| Resistance 39 | do | 0.5 |
| Resistance 47' | ohms | 10,000 |
| Resistance 48' | do | 10,000 |
| Resistance 49' | do | 15,000 |
| Resistance 52' | do | 1.38 |
| Resistance 146 | do | 10,000 |
| Resistance 147 | do | 2,000 |
| Resistance 148 | do | 10,000 |
| Resistance 149 | do | 2,000 |
| Resistance 154 | do | 200 |
| Resistance 155 | do | 525 |
| Resistance 156 | do | 1,200 |
| Resistance 157 | do | 7,500 |
| Resistance 158 | do | 225 |
| Resistance 159 | do | 275 |
| Resistance 160 | do | 400 |
| Resistance 161 | | Infinity |
| Resistance 162 | ohms | 225 |
| Condenser 37 | mfd | 20 |
| Condenser 40 | do | 10 |

When the circuit components are so chosen, the combined resistance of the feedback resistance 52' and the collective resistances 152 and 153 is the same for all of the ranges; namely, 200 ohms. That is to say, this resistance is the same irrespective of the position to which the selector switch 150 is adjusted. The feedback potential impressed on the feedback resistor 52' moreover is at least 90% of the unknown potential under measurement regardless of the range to which the apparatus is adjusted. The range of the potential drop produced across the resistance 162, the terminals of which are connected to the recorder input circuit is 4 millivolts for all of the ranges. Furthermore, for all ranges except the 1 microvolt range the deflection of the galvanometer 7 is the same. Because of the desirability of having 90% feedback potential for the one microvolt range the galvanometer deflection is only one-fourth that of the other ranges.

In Fig. 9 is illustrated another modification of the measuring circuit, pre-amplifier unit, and power and control unit of the arrangement of Fig. 2 which permits a substantial reduction in the amount of equipment involved. The measuring circuit 1 of the arrangement of Fig. 9 may be identical to that of Fig. 2. The pre-amplifier unit and the power and control unit of Fig. 9 differ from that of the arrangement of Fig. 2, however, in that alternating voltage is utilized for energizing the photoelectric cells 16 and 17 and for energizing the anode circuits of the triodes 43 and 44. To this end, the anodes of the photoelectric cells 16 and 17 are directly connected together and to a tap 163 on the high voltage secondary winding 164 of a transformer 165 having a line voltage primary winding 166 connected to the alternating current supply mains 21 and 22 through a switch 27 and a fuse 28 and also having a low voltage secondary winding 167. The low voltage secondary winding 167 is provided for energizing the heater filaments of the triodes 43 and 44, which heater filaments are connected in parallel to the terminals of the transformer secondary winding 167. One end terminal of the transformer secondary winding 164 is connected by a conductor 168 to the point of engagement of the resistances 19 and 20 which are connected in circuit with the photoelectric cells 16 and 17, respectively. Due to the rectifying action of the photoelectric cells 16 and 17, pulsating potential drops which are in phase are produced across the resistances 19 and 20. When these pulsating potential drops are equal in magnitude, the bridge circuit 18 is balanced, and therefore, the potential of the conductor 46 which is connected to the point of engagement of the resistance 20 and the cathode of cell 17 will be at the same potential as that of the conductor 45 which is connected to the point of engagement of the resistance 19 and the cathode of the photoelectric cell 16. This condition obtains when the photoelectric cells 16 and 17 are both dark or when they are equally illuminated.

The cathode circuit of the triode 43 includes a fixed resistance 47' as in the arrangement of Fig. 2 and the cathode circuit of the triode 44 similarly includes a fixed resistance 48'. A potentiometer resistance 49" is also included in the cathode circuits of the triodes 43 and 44. The contact of the potentiometer resistance 49" is connected to the conductor 168 and thereby to the point of engagement of the resistances 19 and 20. The other terminal of resistance 19 is connected by the conductor 45 to the control electrode of the triode 43 and the other terminal of the resistance 20 is connected by the conductor 46 to the control electrode of the triode 44. Thus, the input circuits of the triodes 43 and 44 are arranged to be controlled in accordance with the pulsating potential drops which are produced across the resistances 19 and 20, respectively.

The anode circuits of the triodes 43 and 44 are also supplied with energizing current from the transformer secondary winding 164 through a circuit which may be traced from the grounded conductor 168 to the contact at the potentiometer resistance 49" to a parallel circuit including a portion of the resistance 49", the resistance 47', and the cathode to anode resistance in one branch, and the remaining portion of the resistance 49'', the resistance 48' and the anode to cathode resistance of the triode 44 in the branch. The anodes of the triodes 43 and 44 are connected together and are connected by a conductor 169 to the other terminal of the transformer secondary winding 164. With this arrangement the triodes 43 and 44 are arranged to be rendered conductive on the same half cycle that the photoelectric cells 16 and 17 are conductive.

The feedback circuit in the arrangement of Fig. 9 may be traced from the right end terminal of the potentiometer resistance 49'' through conductor 54, resistance 52, a resistance 170, the terminals of which are connected to the input circuit of the recorder 4, and the conductor 55 in which a resistance 171 is inserted to the other terminal of the potentiometer resistance 49''. While no means have been illustrated in connection with Fig. 9 for changing the range of the instrument, it will be apparent to those skilled in the art that a range changing switch as disclosed in Fig. 2 or in Fig. 6 may be provided in the arrangement of Fig. 9. Moreover, a reversing switch 53 may also be provided, if desired, as in the arrangement of Fig. 2 for facilitating the placing of the apparatus into operation. While the full wave rectifier 24 and the filter 25 of the Fig. 2 arrangement have been eliminated in the arrangement of Fig. 9, the operation of the arrangement of Fig. 9 is fundamentally the same as that of Fig. 2.

Although the arrangement of Fig. 9 permits considerable simplification and reduction in the amount of equipment involved over the arrangement of Figs. 2 and 6, we prefer to employ the latter arrangements. It has been determined experimentally that undesired effects due to presence of alternating current strays are eliminated with the arrangement of Figs. 2 and 6 and particularly with the arrangement of Fig. 6 while the arrangement of Fig. 9 is susceptible to trouble from this source.

It will be apparent that the motor 77 of the recorder 4 may be employed to operate a control valve or the like for governing the supply of an agent as is required to maintain constant or within a predetermined range of values the condition from which is derived the small unidirectional potential which is impressed on the measuring circuit terminals 5 and 6. For example, when the apparatus is employed to differentiate between isomeric and other closely related chemical compounds, the motor 77 may desirably be operated to adjust a valve to control the supply of an agent as is required to maintain the production of a predetermined isomeric compound. Or if desired, another motor operated together with or regulated by the motor 77 may be so employed. Preferably, control provisions operated in accordance with the deflections of the disk 131 as is disclosed in the Caldwell application, Serial No. 447,863, filed June 20, 1942, or as disclosed in the Jordan application, Serial No. 468,925, filed December 14, 1942, may be employed for this purpose.

While in accordance with the provisions of the statutes, we have illustrated and described the best form of our invention now known to us, it will be apparent to those skilled in the art that changes will be made in the form of the apparatus disclosed without departing from the spirit of our invention as set forth in the appended claims, and that certain features of our invention may sometimes be used to advantage without a corresponding use of other features.

Having now described our invention, what we claim as new and desire to secure by Letters Patent is as follows:

1. In combination, a balanceable measuring circuit including in series a voltage sensitive device, a resistance, and a source of small potential to be measured, means responsive to actuation of said voltage sensitive device, and means including a pair of balanced space discharge devices controlled by said first mentioned means to produce a potential drop across said resistance and to vary said potential drop as required to maintain in a condition of equilibrium the potential drop across said resistance and said source of small potential to be measured while maintaining fixed the value of resistance in said balanceable circuit.

2. In combination, a balanceable measuring circuit including in series a galvanometer, a resistance, and a source of small potential to be measured, light sensitive means responsive to deflections of said galvanometer from a predetermined position, and a pair of balanced space discharge devices controlled by said light sensitive responsive means to produce a potential drop across said resistance and to vary said potential drop as required to substantially balance the galvanometer while maintaining fixed the value of resistance in said galvanometer circuit.

3. In combination, a balanceable measuring circuit including in series a voltage sensitive device, a resistance, and a source of small potential to be measured, means responsive to actuation of said voltage sensitive device, and means including a bridge circuit having as adjacent balancing arms the space paths, respectively, of a pair of space discharge devices controlled by said means to produce a potential drop across said resistance and to vary said potential drop as required to maintain in a condition of equilibrium the potential drop across said resistance and said source of small potential to be measured while maintaining fixed the value of resistance in said balanceable circuit.

4. In combination, a balanceable measuring circuit including in series a voltage sensitive device, a resistance, and a source of small unidirectional potential to be measured, means responsive to actuation of said voltage sensitive device, a bridge circuit having as adjacent balancing arms the space paths, respectively, of a pair of space discharge devices controlled by said means to produce a unidirectional potential drop across said resistance and to vary said potential drop as required to maintain in a condition of equilibrium the potential drop across said resistance and said source of small potential to be measured while maintaining fixed the value of resistance in said balanceable circuit, a bridge energizing source of unidirectional potential substantially free from ripple connected to the energizing terminals of said bridge, and means connecting said resistance between the balancing terminals of said bridge.

5. In combination, a balanceable measuring circuit including in series a voltage sensitive device, a resistance, and a source of small unidirectional potential to be measured, means responsive to actuation of said voltage sensitive device, a bridge circuit having as adjacent balancing arms the space paths, respectively, of a pair of space discharge devices controlled by said responsive means to produce a unidirectional potential drop across said resistance and to vary said potential drop as required to maintain in a condition of equilibrium the potential drop across said resistance and said source of small potential to be measured while maintaining fixed the value of resistance in said balancing circuit, a bridge energizing source of alternating potential connected to the energizing terminals of said bridge, and means connecting said resistance between the balancing terminals of said bridge.

6. In combination, a balanceable measuring circuit including in series a voltage sensitive device, a resistance, and a source of small unidirectional potential to be measured, means responsive to actuation of said voltage sensitive device, a bridge circuit having as adjacent balancing arms the space paths, respectively, of a pair of space discharge devices controlled by said responsive means to produce a unidirectional potential drop across said resistance and to vary said potential drop as required to maintain in a condition of equilibrium the potential drop across said resistance and said source of small potential to be measured while maintaining fixed the value of resistance in said balancing circuit, a bridge energizing source of alternating potential connected to the energizing terminals of said bridge, one of said bridge energizing terminals comprising the point of engagement of a resistance and a relatively moveable contact for adjusting the state of balance of said bridge, and means connecting said resistance between the balancing terminals of said bridge.

7. In combination, a balancing circuit including in series a voltage sensitive device, a resistance, and a source of small unidirectional potential to be measured, means responsive to actuation of said voltage sensitive device, a bridge circuit having as adjacent balancing arms the space paths, respectively, of a pair of space discharge devices controlled by said means to produce a unidirectional potential drop across said resistance and to vary the potential drop as required to maintain in a condition of equilibrium the potential drop across said resistance and said source of small potential to be measured while maintaining fixed the value of resistance in said balanceable circuit, a bridge energizing source of unidirectional potential substantially free from ripple connected to the energizing terminals of said bridge, one of said bridge energizing terminals comprising the point of engagement of a resistance and a relatively moveable contact for adjusting the state of balance of said bridge, translating means to exhibit the magnitude of said small potential under measurement, and a circuit including in series said translating device, said resistance, and the balancing terminals of said bridge.

8. In combination, a balanceable measuring circuit including in series a voltage sensitive device, a resistance, and a source of small unidirectional potential to be measured, means responsive to actuation of said voltage sensitive device, a bridge circuit having as adjacent balancing arms the space paths, respectively, of a pair of space discharge devices controlled by said means to produce a unidirectional potential drop across said resistance and to vary the potential drop as required to maintain in a condition of equilibrium the potential drop across said resistance and said source of small potential to be measured while maintaining fixed the value of resistance in said balanceable circuit, a bridge energizing source of unidirectional potential substantially free from ripple connected to the energizing terminals of said bridge, translating means to exhibit the magnitude of said small potential under measurement, a circuit including in series said translating device, said resistance, and the balancing terminals of said bridge, and switching means to reverse the connection of the balancing terminals of said bridge in said last mentioned circuit.

9. In combination, a balanceable measuring circuit including in series a voltage sensitive device, a resistance, and a source of small unidirectional potential to be measured, means responsive to actuation of said voltage sensitive device, a bridge circuit having as adjacent balancing arms the space paths, respectively, of a pair of space discharge devices controlled by said means to produce a unidirectional potential drop across said resistance and to vary said potential drop as required to maintain in a condition of equilibrium the potential drop across said resistance and said source of small potential to be measured while maintaining fixed the value of resistance in said balanceable circuit, a bridge energizing source of unidirectional potential substantially free from ripple connected to the energizing terminals of said bridge, an adjustable potentiometer resistance, a circuit including in series said potentiometer resistance, said first mentioned resistance, and the balancing terminals of said bridge, and means to measure the unidirectional potential drop produced across said potentiometer resistance comprising means to oppose the potential drop produced across said potentiometer resistance to a unidirectional potential of known magnitude, means to derive from the resultant of said opposed potentials a corresponding potential alternating in polarity and of fixed frequency, means to amplify said derived alternating potential, and means to apply said amplified potential to vary said known potential to reduce the resultant of said opposed potentials substantially to zero.

10. In combination, a balanceable measuring circuit including in series a voltage sensitive device, a resistance, and a source of small unidirectional potential to be measured, means responsive to actuation of said voltage sensitive device, a bridge circuit having as adjacent balancing arms the space paths, respectively, of a pair of space discharge devices controlled by said means to produce a unidirectional potential drop across said resistance and to vary said potential drop as required to maintain in a condition of equilibrium the potential drop across said resistance and said source of small potential to be measured while maintaining fixed the value of resistance in said balanceable circuit, a bridge energizing source of unidirectional potential substantially free from ripple connected to the energizing terminals of said bridge, an adjustable potentiometer resistance, a circuit including in series said potentiometer resistance, said first mentioned resistance, and the balancing terminals of said bridge, switching means to reverse the balancing terminals of said bridge in said last mentioned circuit, and means to measure the unidirectional potential drop produced across said potentiometer resistance comprising means to oppose the potential drop produced across said potentiometer resistance to a unidirectional potential of known magnitude, means to derive from the resultant of said opposed potentials a corresponding potential alternating in polarity and of fixed frequency, means to amplify said derived alternating potential, and means to apply said amplified potential to vary said known potential to reduce the resultant of said opposed potentials substantially to zero.

11. In combination, a balanceable measuring circuit including in series a voltage sensitive device, a resistance, and a source of small unidirectional potential to be measured, means responsive to actuation of said voltage sensitive device, a bridge circuit having as adjacent balancing arms the space paths, respectively, of a pair of space discharge devices controlled by said means to produce a unidirectional potential drop across said resistance and to vary said potential drop as required to maintain in a condition of equilibrium the potential drop across said resistance and said source of small potential to be measured while maintaining fixed the value of resistance in said balanceable circuit, a bridge energizing source of unidirectional potential substantally free from ripple connected to the energizing terminals of said bridge, an adjustable potentiometer resistance, a circuit including in series said potentiometer resistance, said first mentioned resistance, and the balancing terminals of said bridge, adjustable resistance means to divert a variable amount of the bridge unbalanced current flow from said first mentioned resistance, and means to measure the unidirectional potential drop produced across a portion of said potentiometer resistance depending upon the adjustment of the latter comprising means to oppose the potential drop produced across said potentiometer resistance to a unidirectional potential of known magnitude, means to derive from the resultant of said opposed potentials a corresponding potential alternating in polarity and of fixed frequency, means to amplify said derived alternating potential, and means to apply said amplified potential to vary said known potential to reduce the resultant of said opposed potentials substantially to zero.

12. In combination, a balanceable measuring circuit including in series a voltage sensitive device, a resistance, and a source of small unidirectional potential to be measured, means responsive to actuation of said voltage sensitive device, a bridge circuit having as adjacent balancing arms the space paths, respectively, of a pair of space discharge devices controlled by said means to produce a unidirectional potential drop across said resistance and to vary said potential drop as required to maintain in a condition of equilibrium the potential drop across said resistance and said source of small potential to be measured while maintaining fixed the value of resistance in said balanceable circuit, a bridge energizing source of unidirectional potential substantially free from ripple connected to the energizing terminals of said bridge, an adjustable potentiometer resistance, a first variable resistance, a second variable resistance, a fixed resistance, a circuit including in series the balancing terminals of said bridge, said first variable resistance, said potentiometer resistance, and a parallel network including said fixed resistance in one branch and said second variable resistance and said first mentioned resistance in series in the other branch, switching means to reverse the balancing terminals of said bridge in said last mentioned circuit, and means to measure the unidirectional potential drop produced across a portion of said potentiometer resistance depending upon the adjustment of the latter comprising means to oppose the potential drop produced across said potentiometer resistance to a unidirectional potential of known magnitude, means to derive from the resultant of said opposed potentials a corresponding potential alternating in polarity and of fixed frequency, means to amplify said derived alternating potential, and means to apply said amplified potential to vary said known potential to reduce the resultant of said opposed potentials substantially to zero.

13. In combination, a balanceable measuring circuit including in series a first resistance, a galvanometer, a second resistance, and a third resistance, clamping means to join the adjacent ends of said resistances in said circuit, a thermos bottle, means to support all of said resistances in said thermos bottle, a source of small unidirectional potential to be measured, means to impress said potential on said third resistance, means responsive to actuation of said galvanometer, a bridge circuit having as adjacent balancing arms the space paths respectively, of a pair of space discharge devices controlled by said responsive means to produce a unidirectional potential drop across said first resistance and to vary said potential drop as required to maintain in a condition of equilibrium the potential drop across said first resistance and said source of small unidirectional potential to be measured while maintaining fixed the value of resistance in said balanceable circuit, a bridge energizing source of unidirectional potential substantially free from ripple connected to the energizing terminals of said bridge, one of said bridge energizing terminals comprising the point of engagement of a resistance and a relatively movable contact for adjusting the state of balance of said bridge, a first variable resistance, an adjustable potentiometer resistance, a fixed resistance, a second variable resistance, a circuit including in series the balancing terminals of said bridge, said first variable resistance, said potentiometer resistance, and a parallel network including said fixed resistance in one branch and said second variable resistance and said first resistance in series in the other branch, and means to measure the unidirectional potential drop produced across a portion of said potentiometer resistance depending upon the adjustment of the latter comprising means to oppose the potential drop produced across said potentiometer resistance to a unidirectional potential of known magnitude, means to derive from the resultant of said opposed potentials a corresponding potential alternating in polarity and of fixed frequency, means to amplify said derived alternating potential, and means to apply said amplified potential to vary said known potential to reduce the resultant of said opposed potentials substantially to zero.

14. In combination, a balanceable measuring circuit including in series a first resistance, a galvanometer, a second resistance, and a third resistance, all of said resistances being composed of the same material, clamping means to join the adjacent ends of said resistances in said circuit, means to maintain all of said resistances at the same temperature, a source of small unidirectional potential to be measured, means to impress said potential on said third resistance, means responsive to actuation of said galvanometer, a bridge circuit having as adjacent balancing arms the space paths, respectively, of a pair of space discharge devices controlled by said responsive means to produce a unidirectional potential drop across said first resistance and to vary said potential drop as required to maintain in a condition of equilibrium the potential drop across said first resistance and said source of small unidirectional potential to be measured while maintaining fixed the value of resistance in said balanceable circuit, a bridge energizing source of unidirectional potential substantially free from ripple connected to the energizing terminals of said bridge, a first variable resistance, an adjustable potentiometer resistance, a fixed resistance, a second variable resistance, a circuit including in series the balancing terminals of said bridge, said first variable resistance, said potentiometer resistance, and a parallel network including said fixed resistance in one branch and said second variable resistance and said first mentioned resistance in series in the other branch, and means to measure the unidirectional potential drop produced across a portion of said potentiometer resistance depending upon the adjustment of the latter.

15. In combination, a balanceable measuring circuit including in series a first resistance, a galvanometer, a second resistance, and a third resistance, all of said resistances being composed of copper, copper clamps to join the adjacent ends of said resistances in said circuit, a thermos bottle, means to support all of said resistances in said thermos bottle, a source of small unidirectional potential to be measured, means to impress said potential on said third resistance, means responsive to actuation of said galvanometer, a bridge circuit having as adjacent balancing arms the space paths, respectively, of a pair of space discharge devices controlled by said responsive means to produce a unidirectional potential drop across said first resistance and to vary said potential drop as required to maintain in a condition of equilibrium the potential drop across said first resistance and said source of small unidirectional potential to be measured while maintaining fixed the value of resistance in said balanceable circuit, a bridge energizing source of unidirectional potential substantially free from ripple connected to the energizing terminals of said bridge, translating means to exhibit the magnitude of said small potential under measurement, and a circuit including in series said translating device, said first resistance, and the balancing terminals of said bridge.

16. In combination, a balanceable measuring circuit including in series a first resistance, a galvanometer, a second resistance, and a third resistance, all of said resistances being composed of the same material, clamping means of the same material as said resistances to join the adjacent ends of said resistances in said circuit, means to maintain all of said resistances at the same temperature, a source of small unidirectional potential to be measured, means to impress said potential on said third resistance, means responsive to actuation of said galvanometer, and means controlled by said responsive means to produce a unidirectional potential drop across said first resistance and to vary said potential drop as required to maintain in a condition of equilibrium the potential drop across said first resistance and said source of small unidirectional potential to be measured while maintaining fixed the value of resistance in said balanceable circuit.

17. In combination, a balanceable measuring circuit including in series a voltage sensitive device, a resistance, and a source of small unidirectional potential to be measured, means responsive to actuation of said voltage sensitive device, a bridge circuit having as adjacent balancing arms the space paths, respectively, of a pair of space discharge devices controlled by said means to produce a unidirectional potential drop across said resistance and to vary said unidirectional potential drop as required to maintain in a condition of equilibrium the potential drop across said resistance and said source of small potential to be measured while maintaining fixed the value of resistance in said balanceable circuit, a bridge energizing source of unidirectional potential substantially free from ripple connected to the energizing terminals of said bridge, translating means to exhibit the magnitude of said small potential under measurement, and a circuit including in series said translating device, said resistance, and the balancing terminals of said bridge.

18. In combination, a balanceable measuring circuit including in series a voltage sensitive device, a resistance, and a source of small unidirectional potential to be measured, means responsive to actuation of said voltage sensitive device, a bridge circuit having as adjacent balancing arms the space paths, respectively, of a pair of space discharge devices controlled by said means to produce a unidirectional potential drop across said resistance and to vary said unidirectional potential drop as required to maintain in a condition of equilibrium the potential drop across said resistance and said source of small potential to be measured while maintaining fixed the value of resistance in said balanceable circuit, a bridge energizing source of unidirectional potential substantially free from ripple connected to the energizing terminals of said bridge, translating means to exhibit the magnitude of said small potential under measurement, a circuit including in series said translating device, said resistance, and the balancing terminals of said bridge, and switching means to reverse the balancing terminals of said bridge in said last mentioned circuit.

19. In combination, a balanceable measuring circuit including in series a voltage sensitive device, a resistance, and a source of small unidirectional potential to be measured, means responsive to actuation of said voltage sensitive device, a bridge circuit having as adjacent balancing arms the space paths, respectively, of a pair of space discharge devices controlled by said means to produce a unidirectional potential drop across said resistance and to vary said unidirectional potential drop as required to maintain in a condition of equilibrium the potential drop across said resistance and said source of small potential to be measured while maintaining fixed the value of resistance in said balanceable circuit, a bridge energizing source of unidirectional potential substantially free from ripple connected to the energizing terminals of said bridge, an adjustable potentiometer resistance, a first variable resistance, a second variable resistance, a fixed resistance, a circuit including in series the balancing terminals of said bridge, said first variable resistance, said potentiometer resistance, and a parallel network including said fixed resistance in one branch and said second variable resistance and said first mentioned resistance in series in the other branch, switching means to reverse the balancing terminals of said bridge in said last mentioned circuit, and a translating device connected across a portion of said potentiometer resistance depending upon the adjustment of the latter to exhibit the magnitude of the small potential under measurement.

20. In combination, a balanceable measuring circuit including in series a voltage sensitive device, a resistance, and a source of small unidirectional potential to be measured, means responsive to actuation of said voltage sensitive device, a bridge circuit having as adjacent balancing arms the space paths, respectively, of a pair of space discharge devices controlled by said means to produce a unidirectional drop across said resistance and to vary said potential drop as required to maintain in a condition of equilibrium the potential drop across said resistance and said source of small potential to be measured while maintaining fixed the value of resistance in said balanceable circuit, a source of alternating current, transformer and rectifier means to derive from said source of alternating current a bridge energizing source of unidirectional potential substantially free from ripple, means to apply said derived energizing source of potential to the energizing terminals of said bridge, translating means to exhibit the magnitude of said small potential under measurement, and a circuit including in series said translating device, said resistance, and the balancing terminals of said bridge.

21. In combination, a balanceable measuring circuit including in seres a voltage sensitive device, a resistance, and a source of small unidirectional potential to be measured, means responsive to actuation of said voltage sensitive device, a bridge circuit having as adjacent balancing arms the space paths, respectively, of a pair of space discharge devices controlled by said means to produce a unidirectional potential drop across said resistance and to vary said potential drop as required to maintain in a condition of equilibrium the potential drop across said resistance and said source of small potential to be measured while maintaining fixed the value of resistance in said balanceable circuit, a source of alternating current, transformer and rectifier means to derive from said source of alternating current a bridge energizing source of unidirectional potential substantially free from ripple, the negative end of said energizing source being grounded, means to apply said derived energizing source of potential to the energizing terminals of said bridge, translating means to exhibit the magnitude of said small potential under measurement, and a circuit including in series said translating device, said resistance, and the balancing terminals of said bridge.

22. In combination, a balanceable measuring circuit including in series a voltage sensitive device, a resistance, and a source of small unidirectional potential to be measured, means responsive to actuation of said voltage sensitive device, a bridge circuit having as adjacent balancing arms the space paths, respectively, of a pair of space discharge devices controlled by said means to produce a unidirectional potential drop across said resistance and to vary said potential drop as required to maintain in a condition of equilibrium the potential drop across said resistance and said source of small potential to be measured while maintaining fixed the value of resistance in said balanceable circuit, a source of alternating current, transformer and rectifier means to derive from said source of alternating current a bridge energizing source of unidirectional potential substantially free from ripple, the negative end of said energizing source being grounded, means to apply said derived energizing source of potential to the energizing terminals of said bridge, translating means to exhibit the magnitude of said small potential under measurement, a circuit including in series said translating device, said resistance, and the balancing terminals of said bridge, and adjustable resistance means included in said last mentioned series circuit to divert a variable amount of the bridge unbalanced current flow from said resistance while maintaining fixed the total value of resistance in said series circuit.

23. In combination, a balanceable measuring circuit including in series a voltage sensitive device, a resistance, and a source of small unidirectional potential to be measured, means responsive to actuation of said voltage sensitive device, a bridge circuit having as adjacent balancing arms the space paths, respectively, of a pair of space discharge devices controlled by said means to produce a unidirectional potential drop across said resistance and to vary said potential drop as required to maintain in a condition of equilibrium the potential drop across said resistance and said source of small potential to be measured while maintaining fixed the value of resistance in said balanceable circuit, a bridge energizing source of unidirectional potential substantially free from ripple connected to the energizing terminals of said bridge, translating means to exhibit the magnitude of said small potential under measurement, a circuit including in series said translating device, said resistance, and the balancing terminals of said bridge, and adjustable resistance means included in said last mentioned series circuit to divert a variable amount of the bridge unbalanced current flow from said resistance while maintaining fixed the total value of resistance in said series circuit.

24. In combination, a balanceable measuring circuit including in series a voltage sensitive device, a resistance, and a source of small unidirectional potential to be measured, means responsive to actuation of said voltage sensitive device, a bridge circuit having as adjacent balancing arms the space paths, respectively, of a pair of space discharge devices, each having an anode, a cathode and a control electrode, controlled by said means to produce a unidirectional potential drop across said resistance and to vary said potential drop as required to maintain in a condition of equilibrium the potential drop across said resistance and said source of small potential to be measured while maintaining fixed the value of resistance in said balanceable circuit, a source of alternating current, transformer and rectifier means to derive from said source of alternating current a bridge energizing source of unidirectional potential substantially free from ripple, the negative end of said energizing source being grounded, means to apply said derived energizing source of potential to the energizing terminals of said bridge, one of said energizing terminals comprising the point of engagement of a resistance connected in the anode circuit of said space discharge devices and a relatively movable contact for adjusting the state of balance of said bridge, translating means to exhibit the magnitude of said small potential under measurement, a first variable resistance means, a second variable resistance means, a parallel circuit including said first variable resistance means in one branch and said second variable resistance means in series with said first mentioned resistance in the other branch, a circuit including in series said translating device, said resistance, said parallel circuit, and the balancing terminals of said bridge, and a single member to simultaneously adjust said first and second variable resistance means to divert a variable amount of the bridge unbalanced current flow from said resistance while maintaining fixed the total value of resistance of said parallel circuit.

25. In combination, a balanceable measuring circuit including in series a voltage sensitive device, a resistance, and a source of small unidirectional potential to be measured, means responsive to actuation of said voltage sensitive device, means controlled by said responsive means to produce a unidirectional potential drop across said resistance and to vary said potential drop as required to maintain in a condition of equilibrium the potential drop across said resistance and said source of small potential to be measured while maintaining fixed the value of resistance in said balanceable circuit, translating means to exhibit the magnitude of said small potential under measurement, a first variable resistance means, a second variable resistance means, a parallel circuit including said first variable resistance means in one branch and said second variable resistance means in series with said first mentioned resistance in the other branch, a circuit including in series said translating device, said resistance, said parallel circuit, and said second mentioned means, and a single member to simultaneously adjust said first and second variable resistance means to divert a variable amount of current from said resistance while maintaining fixed the total value of resistance of said parallel circuit.

26. Apparatus to measure a small unidirectional voltage source including a bridge having as adjacent balancing arms the space paths, respectively, of a pair of space discharge devices, means responsive to unbalance of said bridge to derive an electrical potential varying in accordance with the state of balance of said bridge including a second bridge having as adjacent balancing arms the space paths, respectively, of a pair of space discharge devices each having an anode, a cathode and a control electrode, a balancing circuit including in series said small voltage source, a resistance upon which said derived electrical potential is impressed and means responsive to unbalanced current flow in said balancing circuit for oppositely varying the space path resistances of said first and second electric discharge devices to maintain said balancing circuit in a condition of equilibrium, and translating means responsive to said derived potential.

27. Apparatus to measure a small unidirectional voltage source including a bridge having as adjacent balancing arms the space paths, respectively, of a pair of space discharge devices, means responsive to unbalance of said bridge to derive an electrical potential varying in accordance with the state of balance of said bridge including a second bridge having as adjacent balancing arms the space paths respectively of a pair of space discharge devices each having an anode, a cathode and a control electrode, a source of unidirectional voltage substantially free from ripple connected to the energizing terminals of said bridges, one of said energizing terminals comprising the point of engagement of a resistance and a relatively moveable contact for adjusting the state of balance of said second bridge, a balancing circuit including in series said small voltage source, a resistance upon which said derived electrical potential is impressed, the balancing terminals of said bridge and means responsive to unbalanced current flow in said balancing circuit for oppositely varying the space path resistances of said first and second electric discharge devices to maintain said balancing circuit in a condition of equilibrium, and translating means responsive according to the magnitude of said derived potential.

28. Apparatus to measure a small unidirectional voltage source including a bridge having as adjacent balancing arms the space paths, respectively, of a pair of light sensitive devices, a source of light, means responsive to unbalance of said bridge to derive an electrical potential varying in accordance with the state of balance of said bridge including a second bridge having as adjacent balancing arms the space paths respectively of a pair of space discharge devices each having an anode, a cathode and a control electrode, a balancing circuit including in series said small voltage source, a resistance upon which said derived electrical potential is impressed and a galvanometer responsive to unbalanced current flow in said balancing circuit and operative to control said light source to oppositely vary the illumination of said light sensitive devices to maintain said balancing circuit in a condition of equilibrium, and translating means responsive to said derived potential.

29. Apparatus to measure a small unidirectional voltage source including a bridge having as adjacent balancing arms the space paths, respectively, of a pair of light sensitive devices, a source of light, a source of unidirectional energizing voltage substantially free from ripple, means to connect said source of energizing voltage to the energizing terminals of said bridge, means responsive to unbalance of said bridge to derive an electrical potential varying in accordance with the state of balance of said bridge including a second bridge having as adjacent balancing arms the space paths, respectively, of a pair of space discharge devices each having an anode, a cathode and a control electrode, a connection from each of said control electrodes to a respective balancing terminal of said first-mentioned bridge, means to connect said source of energizing voltage to the energizing terminals of said second-mentioned bridge, a balancing circuit including in series said small voltage source, a resistance upon which said derived electrical potential is impressed and a galvanometer responsive to unbalanced current flow in said balancing circuit and operative to control said light source to oppositely vary the illumination of said light sensitive devices to maintain said balancing circuit in a condition of equilibrium, and translating means responsive to said derived potential.

30. Apparatus to measure a small unidirectional voltage source including a bridge having as adjacent balancing arms the space paths, respectively, of a pair of space discharge devices, a source of alternating voltage, means to connect said source of alternating voltage to the energizing terminals of said bridge, means responsive to unbalance of said bridge to derive an electrical potential varying in accordance with the state of balance of said bridge including a second bridge having as adjacent balancing arms the space paths respectively of a pair of space discharge devices each having an anode, a cathode and a control electrode, means to connect said source of alternating voltage to the energizing terminals of said second mentioned bridge, a balancing circuit including in series said small voltage source, a resistance upon which said derived electrical potential is impressed, the balancing terminals of said second mentioned bridge and means responsive to unbalanced current flow in said balancing circuit for oppositely varying the space path resistances of said first and second electric discharge devices to maintain said balancing circuit in a condition of equilibrium, and translating means responsive according to the magnitude of said derived potential.

GABRIELLE ASSET.
FRED J. CURRAN.
WALTER P. WILLS.